(12) United States Patent
Freeman et al.

(10) Patent No.: US 7,196,744 B1
(45) Date of Patent: Mar. 27, 2007

(54) OPTICAL TRANSCEIVER PACKAGE WITH A LIQUID CRYSTAL VARIABLE OPTICAL ATTENUATOR

(75) Inventors: William Freeman, Castro Valley, CA (US); Steve Wang, San Jose, CA (US); Frank H. Levinson, San Jose, CA (US)

(73) Assignee: Finisar Corporation, Sunnyvale, CA (US)

( * ) Notice: Subject to any disclaimer, the term of this patent is extended or adjusted under 35 U.S.C. 154(b) by 67 days.

(21) Appl. No.: 10/688,375

(22) Filed: Oct. 17, 2003

Related U.S. Application Data

(60) Provisional application No. 60/419,355, filed on Oct. 18, 2002.

(51) Int. Cl.
*G02F 1/1335* (2006.01)
*G02F 1/13* (2006.01)

(52) U.S. Cl. .......................... 349/18; 349/193
(58) Field of Classification Search ............... 349/18, 349/196, 1, 193; 385/140; 372/703, 27
See application file for complete search history.

(56) References Cited

U.S. PATENT DOCUMENTS

| | | | |
|---|---|---|---|
| 4,989,938 A | | 2/1991 | Tamulevich |
| 5,015,057 A | | 5/1991 | Rumbaugh et al. |
| 5,020,065 A | * | 5/1991 | Tada ............................ 372/44 |
| 5,276,747 A | * | 1/1994 | Pan .............................. 385/34 |
| 5,436,921 A | | 7/1995 | Corio |
| 5,452,122 A | * | 9/1995 | Tsuneda et al. .............. 359/281 |
| 5,598,293 A | | 1/1997 | Green |
| 5,694,408 A | * | 12/1997 | Bott et al. ....................... 372/6 |
| 5,754,571 A | * | 5/1998 | Endoh et al. .................. 372/20 |
| 6,205,280 B1 | | 3/2001 | Wagoner et al. |
| 6,266,474 B1 | | 7/2001 | Han et al. |
| 6,275,320 B1 | | 8/2001 | Dhuler et al. |
| 6,437,901 B1 | | 8/2002 | Kobayashi et al. |
| 6,580,532 B1 | * | 6/2003 | Yao et al. ...................... 398/39 |
| 6,590,698 B1 | * | 7/2003 | Ohtsuki et al. .............. 359/326 |
| 6,631,224 B2 | * | 10/2003 | Sorin et al. ................... 385/28 |
| 6,717,713 B2 | * | 4/2004 | Onaka et al. ................ 359/281 |
| 6,826,318 B2 | * | 11/2004 | Nagaeda et al. .............. 385/11 |
| 2002/0019274 A1 | * | 2/2002 | Sajima ........................ 473/378 |

* cited by examiner

*Primary Examiner*—Dung T. Nguyen
(74) *Attorney, Agent, or Firm*—Workman Nydegger

(57) ABSTRACT

A liquid crystal optical attenuator is provided that is used to control the intensity of a light signal. The optical attenuator includes at least one polarizing element having an optical polarization axis, wherein the polarizing element transmits a portion of a light signal proportional to the angular difference between the optical polarization axis of the light signal and that of the polarizing element. The optical attenuator also comprises a variable liquid crystal rotator that includes a semi-transparent liquid crystal device, and a plurality of electrodes configured to conduct electricity to the liquid crystal device. The polarization axis of the light signal transmitted through the liquid crystal device will be rotated by an amount proportional to the magnitude of the electricity applied to the plurality of electrodes. In one embodiment, the optical attenuator is employed as part of a laser package that includes a laser, a pair of polarizing elements, and a faraday rotator.

20 Claims, 2 Drawing Sheets

OPTICAL TRANSCEIVER PACKAGE WITH A LIQUID CRYSTAL VARIABLE OPTICAL ATTENUATOR

This application claims the benefit of priority to U.S. Provisional Application No. 60/419,355, filed on Oct. 18, 2002, the disclosure of which is herein incorporated by reference.

BACKGROUND OF THE INVENTION

1. Field of the Invention

This invention relates generally to the field of optical attenuation devices for use in optical systems. In particular, the present invention relates to a variable optical attenuator that requires little space and has no moving parts.

2. Background Technology

Fiber optics are increasingly used for transmitting voice and data signals. As a transmission medium, light provides a number of advantages over traditional electrical communication techniques. For example, light signals allow for extremely high transmission rates and very high bandwidth capabilities. Also, light signals are resistant to electromagnetic interference that would otherwise interfere with electrical signals. Light also provides a more secure signal because it does not emanate the type of high frequency components often experienced with conductor-based electrical signals. Light also can be conducted over greater distances without the signal loss typically associated with electrical signals on a copper conductor.

Many conventional electrical networks are being upgraded to optical networks to take advantage of the increased speed and efficiency. Optical communication networks use lasers to create light which is then modulated to convey information. One of the many components of an optical communications network is an optical attenuator. Optical attenuators control the intensity of one or more wavelengths of light within an optical system. On occasion, it is necessary to recalibrate or replace one or more of the lasers generating light in the system. To avoid data corruption, it is necessary to completely extinguish the laser's light from the optical system before recalibration or replacement. Optical attenuators are capable of extinguishing the laser's light by blocking it from entering the remainder of the optical system. There are numerous general methods of attenuating or completely extinguishing light including polarization, reflection, diffusion, etc. In addition, it is often necessary to control the intensity of a particular wavelength or channel of light entering a fiber. Although it is possible to simply adjust the electrical current feeding a laser to adjust the output intensity, this is not desirable because this method of attenuation will affect the bandwidth capabilities of the laser. Therefore, it is necessary to use a variable optical attenuator to attenuate or adjust the output intensity of a particular laser.

Polarization is often used in optical attenuators to attenuate light signals within an optical system. One type of optical attenuator that utilizes polarization is a mechanical attenuator that contains two or more polarizing elements to attenuate the light signal. When the polarizing elements are rotated with respect to one another the output light is attenuated as a function of the angle between the polarization axis of the polarizing elements. For two polarizing elements, this phenomena follows Malus' law and is stated mathematically: $I_{out} = I_{in} \cos^2 \theta$, where $\theta$ is the angular difference between the polarization axis of the two polarizing elements. Attenuators of this type typically include some form of rotation mechanism to rotate one of the polarizing elements with respect to the other one. It is necessary for the optical attenuator to be variable such that a user can adjust the amount of attenuation for a particular situation. A polarizing element may be a standard polarizer or a crystal containing polarization properties. These crystals include quartz, BBO, YVO4, and the like. Although these types of attenuators are effective at attenuating the light signal, it is undesirable to include moving parts in an optical attenuator. Mechanical devices typically wear out over time and often introduce drift characteristics. Mechanical devices also take up relatively large amounts of precious space and are therefore not suitable for many optical applications.

Therefore, there is a need in the industry for a variable optical attenuator that has no moving parts and takes up very little space. In addition, the optical attenuator should be capable of being incorporated into an optical transceiver package.

SUMMARY OF THE INVENTION

The present invention is directed to a liquid crystal optical attenuator that is used to control the intensity of a light signal. The optical attenuator includes at least one polarizing element having an optical polarization axis, wherein the polarizing element transmits a portion of a light signal proportional to the angular difference between the optical polarization axis of the light signal and that of the polarizing element. The optical attenuator also comprises a variable liquid crystal rotator that includes a semi-transparent liquid crystal device, and a plurality of electrodes configured to conduct electricity to the liquid crystal device. The polarization axis of the light signal transmitted through the liquid crystal device will be rotated by an amount proportional to the magnitude of the electricity applied to the plurality of electrodes.

In one embodiment, the optical attenuator is employed as part of a laser package that includes a laser, a pair of polarizing elements, and a faraday rotator. The optical attenuator in the laser package can also be employed as part of an optical transceiver package.

In a method of attenuating and isolating a light signal according to the invention, a light signal is directed from a laser to a variable liquid crystal rotator and transmitted therethrough. The polarization axis of the light signal is rotated by an amount proportional to the magnitude of the electricity applied to electrodes configured to conduct electricity to a liquid crystal device of the rotator. The light signal is then directed from the variable liquid crystal rotator to a first polarizing element. The light signal is then directed from the first polarizing element to a faraday rotator, and then to a second polarizing element.

These and other features of the present invention will become more fully apparent from the following description and appended claims, or may be learned by the practice of the invention as set forth hereinafter.

BRIEF DESCRIPTION OF THE DRAWINGS

In order to illustrate the manner in which the advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE INVENTION

In general, the present invention relates to a variable liquid crystal attenuator that is used to control the intensity of light transmitting through the attenuator. As will be described in further detail below, the variable liquid crystal attenuator is capable of precisely adjusting the intensity of a light beam from 0 to 100% in response to an electrical voltage. Also, while embodiments of the present invention are described in the context of optical networking, it will be appreciated that the teachings of the present invention are applicable to other applications as well.

Reference will now be made to the drawings to describe various embodiments of the invention. It is to be understood that the drawings are diagrammatic and schematic representations of the embodiments, and are not limiting of the present invention, nor are they necessarily drawn to scale.

Figure 1:
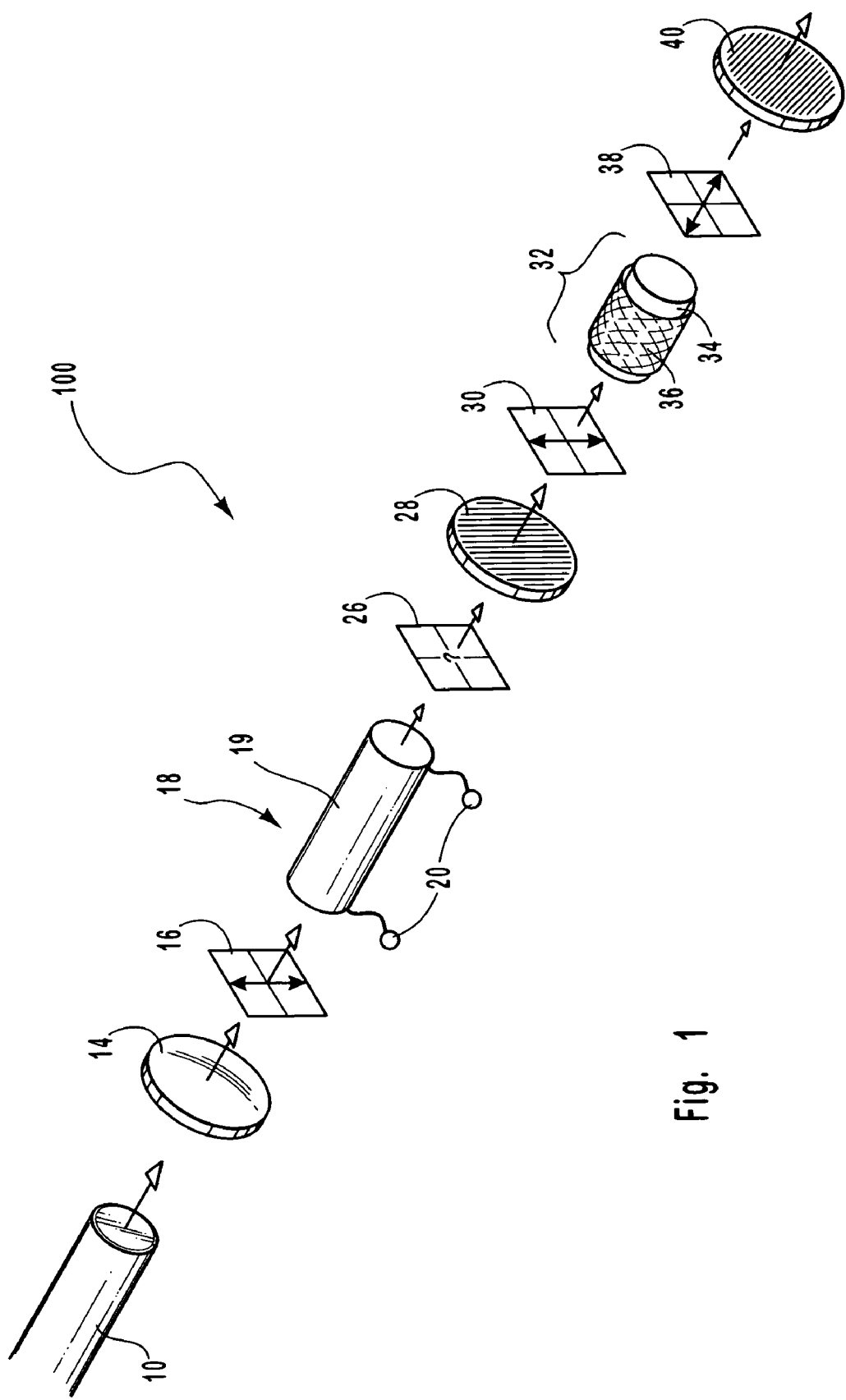
FIG. 1 illustrates a perspective view of one embodiment of a laser package including a liquid crystal attenuator according to the invention.
Figure 2:
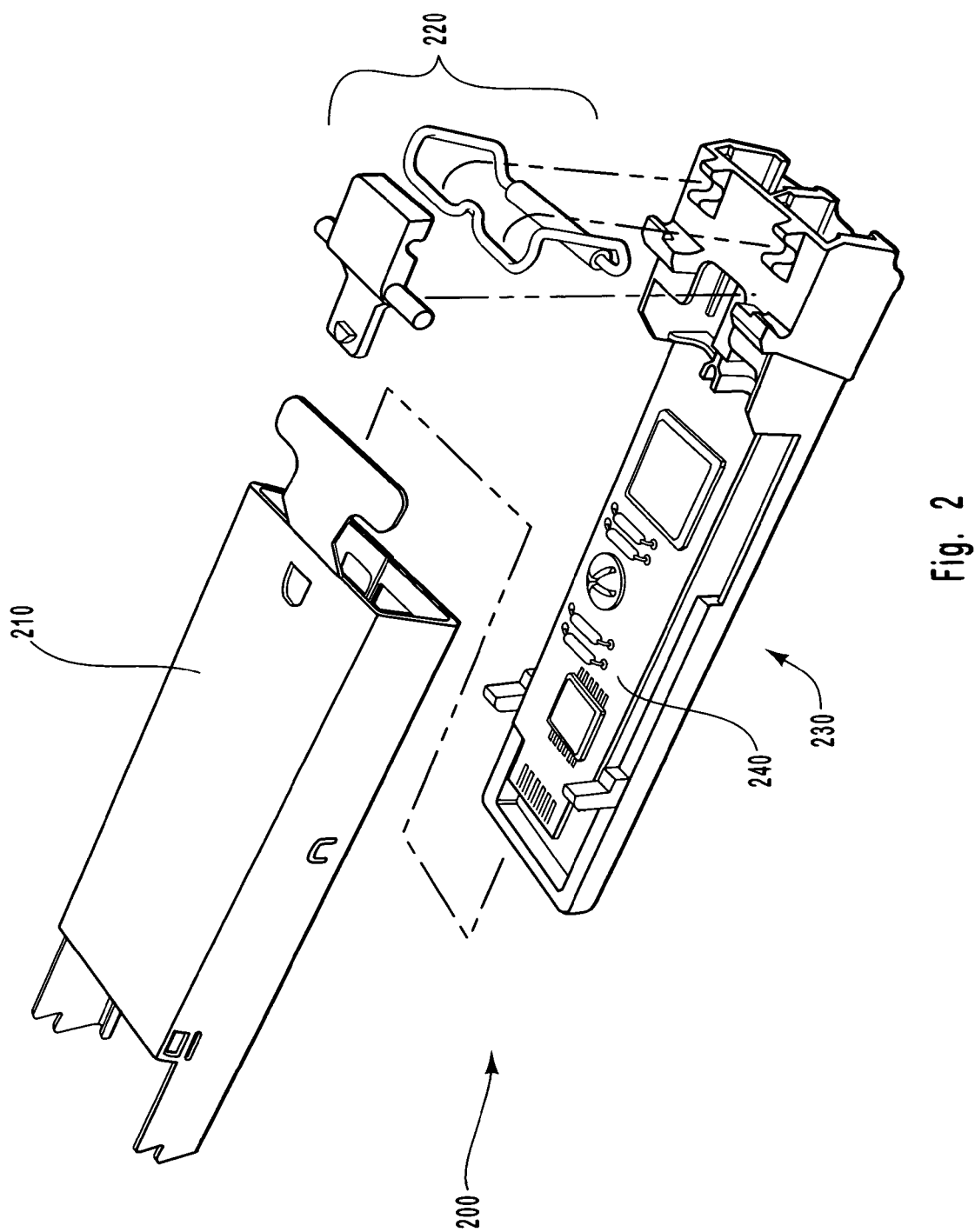
FIG. 2 illustrates an exploded view of an optical transceiver package for housing the laser package of FIG. 1.

Referring first to FIG. 1, a perspective view of one embodiment of a laser package including a liquid crystal attenuator is designated generally at 100. The laser package 100 is designed for use in an optical transceiver package as illustrated in FIG. 2. A laser 10 generates a light signal of a particular wavelength range. Although illustrated in a cylindrical manner, the laser 10 could be a semiconductor laser, a gas laser or any other type of laser depending on the application parameters. In this embodiment, the laser 10 is a distributed feedback laser which emits a light signal that is essentially limited to one wavelength. The light signal generated by the laser 10 is polarized and has a particular polarization axis. The light signal then passes through a window or lens 14. The window or lens 14 is used to reduce reflections and aberrations that may be present in the original light signal. The light signal maintains the same polarity after passing through the window 14. In this embodiment the laser is oriented to produce a vertical linear polarization as indicated by a first chart 16.

With continued reference to FIG. 1, the light signal is transmitted into a variable liquid crystal rotator 18. The variable liquid crystal rotator 18 is capable of rotating the polarity of the light signal in response to an electrical voltage. Although illustrated in a cylindrical manner, the liquid crystal rotator 18 may be any form of liquid crystal polarization rotation device. Many liquid crystal rotators are known in the art, such as a twisted nematic liquid crystal cell. The variable liquid crystal rotator 18 includes a liquid crystal device 19 and a pair of electrodes 20. When a voltage is applied across the electrodes 20, the variable liquid crystal rotator 18 rotates the polarization axis of a light signal transmitted through the liquid crystal device 19 at an angle proportional to the magnitude of the voltage. The polarization of the light signal exiting the variable liquid crystal rotator 18 is uncertain depending on the magnitude of the applied voltage, as indicated by the uncertain status of a second chart 26.

With continued reference to FIG. 1, the light signal is then transmitted through a first polarizing element 28. A polarizing element is defined as any element with a linear optical polarity such as a polarizer or certain types of crystals. Light that passes through a polarizing element is diminished unless the axis of polarization of the polarizing element is the same as the incident light. For example, if horizontally polarized light is transmitted into a vertical polarizing element, the polarizing element will block essentially all light from passing through the polarizing element. The intensity of the light exiting the first polarizing element 28 depends on the angular difference between the polarization state of the light signal entering the first polarizing element 28 and the orientation of the first polarizing element 28. This relationship is stated mathematically: $I_{out}=I_{in}\cos^2\theta$, where $\theta$ is the angular difference between the polarization of the incoming light signal and that of the first polarizing element 28. Therefore, the intensity of the light signal exiting the first polarizing element 28 is attenuated by a known amount mathematically related to the magnitude of the voltage applied to the liquid crystal rotator 18.

With continued reference to FIG. 1, the light signal exiting the first polarizing element 28 is vertically polarized because the first polarizing element 28 is oriented to produce vertically polarized light. The polarization status of the light signal exiting the first polarizing element 28 is illustrated in a third chart 30. The light signal then enters a faraday rotator 32. The faraday rotator 32 includes a semi-transparent material such as a garnet 34 and a magnetic material 36. The magnetic material 36 is a permanent magnet or a premagnetized hard ferromagnetic material that exhibits remnant magnetization. The garnet 34 and the magnetic material 36 induce a magnetic field across the light signal transmitting through the faraday rotator 32. The magnetic field has the effect of rotating the plane of polarization of the light signal.

The faraday rotator 32 rotates the plane of polarization by a fixed amount related to the magnitude of the permanent magnetic field generated by the magnetic material 36. In this embodiment, the faraday rotator 32 rotates the plane of polarization by 45 degrees in the clockwise direction, as illustrated in a fourth chart 38. The light signal then passes through a second polarizing element 40, which is oriented in a direction to allow the desired portion of the light signal to pass. The first polarizing element 28, the faraday rotator 32, and the second polarizing element 40 effectively isolate a portion of the incident light signal from the laser 10. This isolation is important for avoiding interference and distortion of the light signal during use in an optical communications system. The isolation elements are not required elements for the liquid crystal attenuator but are included to illustrate a preferred embodiment.

Reference is next made to FIG. 2, which illustrates an exploded view of an optical transceiver package for housing the laser package of FIG. 1, designated generally at 200. The optical transceiver package 200 includes a housing 210, a latch system 220, and a module 230. The module 230 further includes a printed circuit board 240 containing the optical and electrical elements for an optical transmitter or laser package and an optical receiver. The laser package illustrated in FIG. 1 can be incorporated as the transmitter in the illustrated transceiver package 200 to form a preferred embodiment of a transceiver package.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An optical attenuator, comprising:
   a variable liquid crystal rotator comprising:
   an at least semi-transparent liquid crystal device; and
   a plurality of electrodes configured to conduct electricity to the at least semi-transparent liquid crystal device such that the polarization axis of a light signal transmitted through the liquid crystal device will be varied by an amount proportional to the magnitude of the electricity applied to the plurality of electrodes;
   a first polarizing element having an optical polarization axis, wherein the first polarizing element receives the light signal from the variable liquid crystal rotator and transmits a portion of the light signal proportional to the angular difference between the optical polarization axis of the light signal and that of the first polarizing element;
   a faraday rotator configured to receive the portion of the light signal from the first polarizing element and rotate the optical polarization axis of the portion of the light signal;
   a second polarizing element having an optical polarization axis, wherein the second polarizing element receives the portion of the light signal and transmits a second portion of the light signal proportional to the angular difference between the optical polarization axis of the portion of the light signal and that of the second polarizing element.

2. The optical attenuator of claim 1, wherein the polarizing element comprises a polarizer having a linear optical polarity.

3. The optical attenuator of claim 1, wherein the semi-transparent liquid crystal device comprises a twisted nematic liquid crystal cell.

4. A laser package comprising:
   a laser configured to generate a light signal having an optical polarization axis;
   a variable liquid crystal rotator comprising:
   an at least semi-transparent liquid crystal device; and
   a plurality of electrodes configured to conduct electricity to the at least semi-transparent liquid crystal device such that the polarization axis of a light signal transmitted through the liquid crystal device will be varied by an amount proportional to the magnitude of the electricity applied to the plurality of electrodes;
   a first polarizing element having an optical polarization axis, wherein the first polarizing element receives the light signal from the variable liquid crystal rotator and transmits a portion of the light signal that is proportional to the angular difference between the optical polarization axis of the light signal and that of the first polarizing element;
   a faraday rotator configured to receive the portion of the light signal from the first polarizing element and rotate the optical polarization axis of the portion of the light signal;
   a second polarizing element having an optical polarization axis, wherein the second polarizing element receives the portion of the light signal and transmits a second portion of the light signal proportional to the angular difference between the optical polarization axis of the portion of the light signal and that of the second polarizing element.

5. The laser package of claim 4, wherein the laser comprises a semiconductor laser or a gas laser.

6. The laser package of claim 4, wherein the laser comprises a distributed feedback laser.

7. The laser package of claim 4, wherein the polarizing element comprises a polarizer having a linear optical polarity.

8. The laser package of claim 4, wherein the semi-transparent liquid crystal device comprises a twisted nematic liquid crystal cell.

9. The laser package of claim 4, further comprising a window or lens interposed between the laser and the variable liquid crystal rotator.

10. An optical transceiver package comprising the laser package of claim 4.

11. A laser package for optical attenuation and isolation, comprising:
    a laser configured to generate a light signal having an optical polarization axis;
    a variable liquid crystal rotator in optical communication with the laser and comprising:
    an at least semi-transparent liquid crystal device; and
    a plurality of electrodes configured to conduct electricity to the at least semi-transparent liquid crystal device such that the polarization axis of the light signal transmitted through the liquid crystal device will be varied by an amount proportional to the magnitude of the electricity applied to the plurality of electrodes;
    a first polarizing element in optical communication with the liquid crystal rotator and having an optical polarization axis, wherein the first polarizing element transmits a portion of the light signal proportional to the angular difference between the optical polarization axis of the light signal and that of the first polarizing element;
    a faraday rotator in optical communication with the first polarizing element and comprising:
    an at least semi-transparent material; and
    a magnetic material at least partially surrounding the at least semi-transparent material and configured to apply a magnetic force to a light signal that is passed through the at least semi-transparent material; and
    a second polarizing element in optical communication with the faraday rotator and having an optical polarization axis, wherein the second polarizing element transmits a portion of an incident light signal proportional to the angular difference between an optical polarization axis of the incident light signal and that of the second polarizing element.

12. The laser package of claim 11, wherein the laser comprises a semiconductor laser or a gas laser.

13. The laser package of claim 11, wherein the laser comprises a distributed feedback laser.

14. The laser package of claim 11, wherein the semi-transparent liquid crystal device comprises a twisted nematic liquid crystal cell.

15. The laser package of claim 11, wherein the polarizing elements each comprise a polarizer having a linear optical polarity.

16. The laser package of claim 11, wherein the semi-transparent material comprises garnet.

17. The laser package of claim 11, wherein the magnetic material of the faraday rotator comprises a permanent magnet or a premagnetized hard ferromagnetic material.

18. The laser package of claim 11, further comprising a window or lens interposed between the laser and the variable liquid crystal rotator.

19. An optical transceiver package comprising the laser package of claim 11.

20. A method of attenuating and isolating a light signal, comprising:

directing a light signal from a laser to a variable liquid crystal rotator, the variable liquid crystal rotator comprising:
an at least semi-transparent liquid crystal device; and
a plurality of electrodes configured to conduct electricity to the at least semi-transparent liquid crystal device;

transmitting at least a portion of the light signal through the liquid crystal device such that the polarization axis of the light signal is rotated by an amount proportional to the magnitude of the electricity applied to the electrodes;

directing the light signal from the variable liquid crystal rotator to a first polarizing element;

directing the light signal from the first polarizing element to a faraday rotator, the faraday rotator comprising:
an at least semi-transparent material; and
a magnetic material at least partially surrounding the at least semi-transparent material; and directing the light signal from the faraday rotator to a second polarizing element.

* * * * *